(12) United States Patent
Martin et al.

(10) Patent No.: US 11,443,018 B2
(45) Date of Patent: *Sep. 13, 2022

(54) LOCKING EXECUTION OF CORES TO LICENSED PROGRAMMABLE DEVICES IN A DATA CENTER

(71) Applicant: Xilinx, Inc., San Jose, CA (US)

(72) Inventors: Brian S. Martin, Longmont, CO (US); Premduth Vidyanandan, Thornton, CO (US); Mark B. Carson, Belfast (GB); Neil Watson, Dunmurry (GB); Gary J. McClintock, Kells (GB)

(73) Assignee: XILINX, INC., San Jose, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 16/299,575

(22) Filed: Mar. 12, 2019

(65) Prior Publication Data

US 2020/0293635 A1  Sep. 17, 2020

(51) Int. Cl.
*G06F 21/12* (2013.01)
*G06F 21/57* (2013.01)
*H04L 9/32* (2006.01)
*G06F 9/50* (2006.01)
*H04L 9/30* (2006.01)

(52) U.S. Cl.
CPC .......... *G06F 21/123* (2013.01); *G06F 9/5027* (2013.01); *G06F 21/575* (2013.01); *H04L 9/3073* (2013.01); *H04L 9/3247* (2013.01); *G06F 2221/0735* (2013.01); *G06F 2221/0755* (2013.01)

(58) Field of Classification Search
CPC ........ G06F 21/602; G06F 21/62; G06F 21/64; G06F 21/6218; G06F 21/44; G06F 21/51; G06F 21/57; G06F 21/629; G06F 9/5011; G06F 9/5027; G06F 9/50; G06F 9/5083
See application file for complete search history.

(56) References Cited

U.S. PATENT DOCUMENTS

| | | | |
|---|---|---|---|
| 9,977,758 B1 * | 5/2018 | Schumacher | G06F 30/34 |
| 10,402,223 B1 * | 9/2019 | Santan | G06F 13/1642 |
| 10,713,404 B1 * | 7/2020 | Schumacher | G06F 8/54 |
| 10,719,366 B1 * | 7/2020 | Gasser | G06F 9/5044 |
| 10,817,353 B1 * | 10/2020 | Kain | G06F 9/3877 |
| 2006/0053283 A1 * | 3/2006 | Feinleib | G06F 21/121 713/165 |
| 2011/0154043 A1 | 6/2011 | Lim et al. | |
| 2015/0186636 A1 * | 7/2015 | Tharappel | G06F 21/32 726/8 |

(Continued)

*Primary Examiner* — Tae K Kim
(74) *Attorney, Agent, or Firm* — Patterson + Sheridan, LLP

(57) ABSTRACT

An example hardware accelerator for a computer system includes a programmable device and further includes kernel logic configured in a programmable fabric of the programmable device, and an intellectual property (IP) checker circuit in the kernel logic. The IP checker circuit is configured to obtain a device identifier (ID) of the programmable device and a signed whitelist, the signed whitelist including a list of device IDs and a signature, verify the signature of the signed whitelist, compare the device ID against the list of device IDs, and selectively assert or deassert an enable of the kernel logic in response to presence or absence, respectively, of the device ID in the list of device IDs and verification of the signature.

20 Claims, 16 Drawing Sheets

(56) References Cited

U.S. PATENT DOCUMENTS

| | | | |
|---|---|---|---|
| 2015/0347752 A1* | 12/2015 | Blaimschein | G06F 9/45558 |
| | | | 726/23 |
| 2016/0117497 A1* | 4/2016 | Saxena | G06F 21/74 |
| | | | 726/23 |
| 2016/0117498 A1* | 4/2016 | Saxena | G06F 9/5027 |
| | | | 726/23 |
| 2016/0170849 A1* | 6/2016 | Cheng | G06F 11/2025 |
| | | | 714/11 |
| 2016/0323106 A1 | 11/2016 | Roper | |
| 2016/0371472 A1* | 12/2016 | Walsh | G06F 21/12 |
| 2017/0264680 A1* | 9/2017 | Palermo | H04L 43/16 |
| 2017/0364707 A1* | 12/2017 | Lal | G06F 13/28 |
| 2018/0157531 A1* | 6/2018 | Bobba | G06F 9/5044 |
| 2018/0212971 A1* | 7/2018 | Costa | G06F 21/6209 |
| 2019/0007212 A1* | 1/2019 | Neve de Mevergnies | |
| | | | G06F 21/6218 |
| 2019/0042329 A1* | 2/2019 | Kakaiya | G06F 13/4282 |
| 2019/0042779 A1* | 2/2019 | Agerstam | G06F 21/6218 |
| 2019/0065260 A1* | 2/2019 | Balle | G06F 11/3466 |
| 2019/0141041 A1* | 5/2019 | Bhabbur | H04L 9/3213 |
| 2019/0361708 A1* | 11/2019 | Soe | G06F 9/30101 |
| 2020/0004963 A1* | 1/2020 | Zheng | G06F 21/566 |
| 2020/0028511 A1* | 1/2020 | Yu | H03K 19/17756 |
| 2020/0067935 A1* | 2/2020 | Carnes, III | H04L 63/105 |
| 2020/0073677 A1* | 3/2020 | Chikin | G06F 9/44542 |
| 2020/0110878 A1* | 4/2020 | Hu | G06F 9/45558 |
| 2020/0133734 A1* | 4/2020 | Artico | G06F 9/5027 |
| 2020/0159888 A1* | 5/2020 | Ghose | G06F 21/71 |
| 2020/0175152 A1* | 6/2020 | Xu | G06F 21/14 |
| 2020/0218816 A1* | 7/2020 | Yang | G06F 16/245 |

* cited by examiner

LOCKING EXECUTION OF CORES TO LICENSED PROGRAMMABLE DEVICES IN A DATA CENTER

TECHNICAL FIELD

Examples of the present disclosure generally relate to electronic circuits and, in particular, to locking execution of cores to licensed programmable devices in a data center.

BACKGROUND

Historically, third party developers of intellectual property (IP) cores (e.g., pre-implemented circuit designs) for programmable devices license their IP to system integrators on a project basis. This allows the system integrator to use the IP on any number of programmable devices. For data center applications, a different use model is desirable, where the IP owner allows a data center owner to execute their IP on a specific number of authorized programmable devices. If the data center owner, or a third party, tries to use the IP on any other than the licensed devices, it is desirable for the IP to fail to operate.

SUMMARY

Techniques for locking execution of cores to licensed programmable devices in a data center are described. In an example, a hardware accelerator for a computer system includes a programmable device and further includes: kernel logic configured in a programmable fabric of the programmable device; and an intellectual property (IP) checker circuit in the kernel logic. The IP checker circuit is configured to: obtain a device identifier (ID) of the programmable device and a signed whitelist, the signed whitelist including a list of device IDs and a signature; verify the signature of the signed whitelist; compare the device ID against the list of device IDs; and selectively assert or deassert an enable of the kernel logic in response to presence or absence, respectively, of the device ID in the list of device IDs and verification of the signature.

In another example, a computer system includes: a processing system; and a hardware accelerator, coupled to the processing system. The hardware accelerator includes: kernel logic configured in a programmable fabric of a programmable device; and an intellectual property (IP) checker circuit in the kernel logic. The IP checker circuit is configured to: obtain a device identifier (ID) of the programmable device and a signed whitelist, the signed whitelist including a list of device IDs and a signature; verify the signature of the signed whitelist; compare the device ID against the list of device IDs; and selectively assert or deassert an enable of the kernel logic in response to presence or absence, respectively, of the device ID in the list of device IDs and verification of the signature.

In another example, a method of locking kernel logic to a programmable device of a hardware accelerator in a computer system includes: configuring kernel logic in a programmable fabric of the programmable device; obtaining, at an intellectual property (IP) checker circuit in the kernel logic, a device identifier (ID) of the programmable device and a signed whitelist, the signed whitelist including a list of device IDs and a signature; verifying the signature of the signed whitelist; comparing the device ID against the list of device IDs; and selectively asserting or deasserting, by the IP checker circuit, an enable of the kernel logic in response to presence or absence, respectively, of the device ID in the list of device IDs and verification of the signature.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
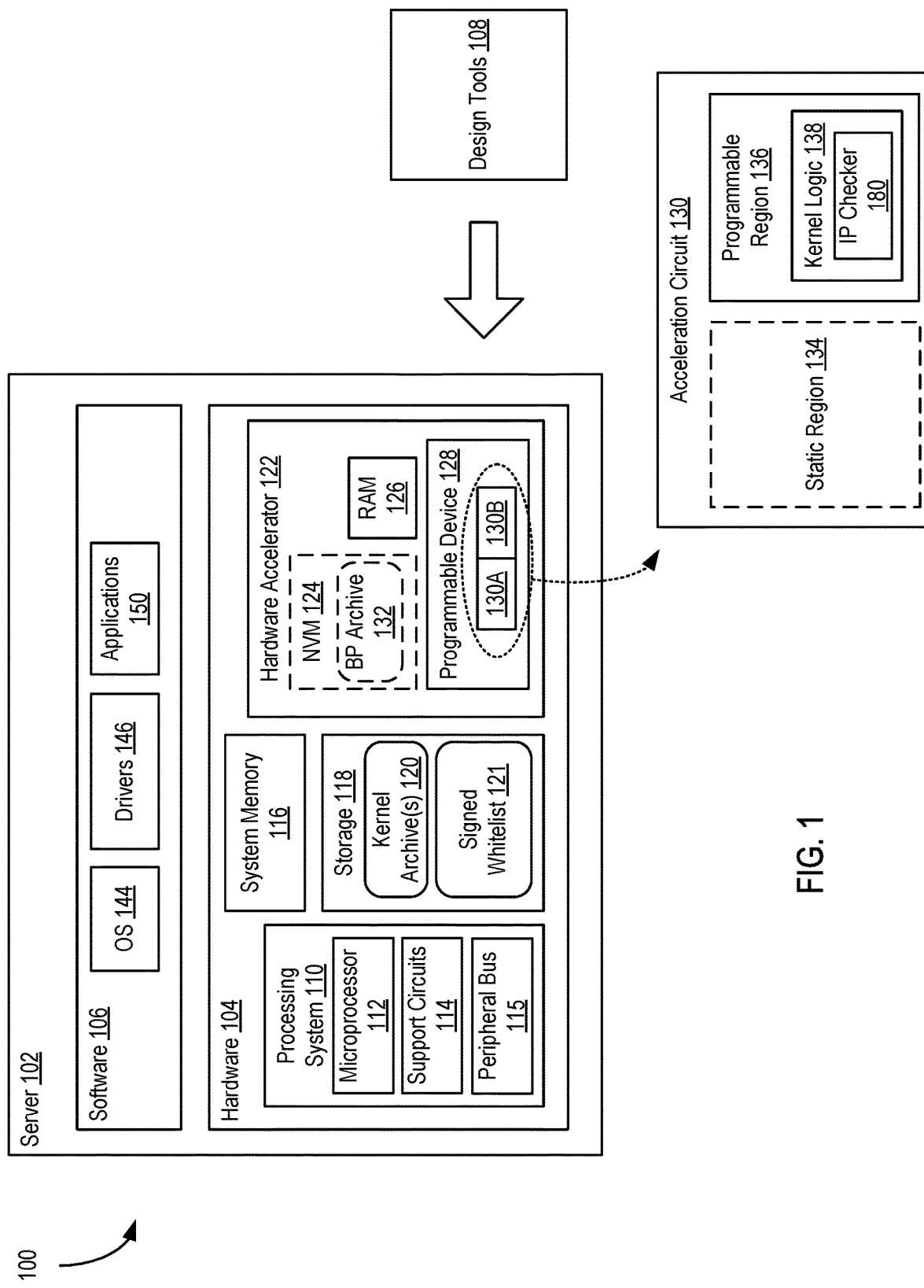
FIG. 1 is a block diagram depicting a computing system according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for locking execution of cores to licensed programmable devices in a data center are described. In an example, an IP-checking function is integrated into a partially reconfigurable kernel in a data center application, which allows individual programmable devices to be identified. If that programmable device is on a "white list", then the IP-checking function enables the operation of the IP in the kernel on that programmable device. Otherwise, the IP-checking function disables the operation of the IP on non-authorized programmable devices. The IP-checking function can resist attacks, such as making one programmable device look like another programmable device or by modifying the "white list" to include other programmable devices. The IP-checking function assists data center and IP owners to agree to add additional programmable devices to the "white list." The IP-checking function prevents acceleration circuits from being massively deployed without the appropriate authorization of the developers of such acceleration circuits. These and other aspects of the techniques are described below with respect to the drawings.

FIG. 1 is a block diagram depicting a computing system 100 according to an example. The computing system 100 can be located in a data center or the like. A data center can include a plurality of computing systems configured similarly to the computing system 100. The computing system 100 includes a server computer (server 102). The server 102 includes a hardware platform ("hardware 104") and a software platform ("software 106") executing on the hardware 104. The hardware 104 includes a processing system 110, system memory 116, storage devices ("storage 118"), and a hardware accelerator 122. The software 106 includes an operating system (OS) 144, driver software (drivers 146), and applications 150.

The processing system 110 includes a microprocessor 112, support circuits 114, and a peripheral bus 115. The microprocessor 112 can be any type of general-purpose central processing unit (CPU), such as an x86-based processor, ARM®-based processor, or the like. The microprocessor 112 can include one or more cores and associated circuitry (e.g., cache memories, memory management units (MMUs), interrupt controllers, etc.). The microprocessor 112 is configured to execute program code that perform one or more operations described herein and which can be stored in the system memory 116 and/or the storage 118. The support circuits 114 include various devices that cooperate with the microprocessor 112 to manage data flow between the microprocessor 112, the system memory 116, the storage 118, the hardware accelerator 122, or any other peripheral device. For example, the support circuits 114 can include a chipset (e.g., a north bridge, south bridge, platform host controller, etc.), voltage regulators, firmware (e.g., a BIOS), and the like. The support circuits 114 manage data flow between the microprocessor 112 and the peripheral bus 115, to which various peripherals, such as the hardware accelerator 122, are connected. In some examples, the microprocessor 112 can be a System-in-Package (SiP), System-on-Chip (SoC), or the like, which absorbs all or a substantial portion of the functionality of the chipset (e.g., north bridge, south bridge, etc.). The peripheral bus can implement an expansion bus standard, such as Peripheral Component Interconnect Express (PCIe). In the example, the processing system 110 is shown separate from the hardware accelerator 122. In other examples discussed further below, the processing system 110 and the hardware accelerator 122 can be implemented on the same integrated circuit (IC).

The system memory 116 is a device allowing information, such as executable instructions and data, to be stored and retrieved. The system memory 116 can include, for example, one or more random access memory (RAM) modules, such as double-data rate (DDR) dynamic RAM (DRAM). The storage 118 includes local storage devices (e.g., one or more hard disks, flash memory modules, solid state disks, and optical disks) and/or a storage interface that enables the server 102 to communicate with one or more network data storage systems. The hardware 104 can include various other conventional devices and peripherals of a computing system, such as graphics cards, universal serial bus (USB) interfaces, and the like.

The hardware accelerator 122 includes a programmable device 128, an optional non-volatile memory 124, and RAM 126. The programmable device 128 can be a field programmable gate array (FPGA) or the like or an SoC having an FPGA or the like. The NVM 124 can include any type of non-volatile memory, such as flash memory or the like. The RAM 126 can include DDR DRAM or the like. The programmable device 128 is coupled to the NVM 124 and the RAM 126. The programmable device 128 is also coupled to the peripheral bus 115 of the processing system 110.

The OS 144 can be any commodity operating system known in the art, such as such as Linux®, Microsoft Windows®, Mac OS®, or the like. The drivers 146 provide application programming interfaces (APIs) to the hardware accelerator 122 for command and control thereof. The applications 150 include software executing on the microprocessor 112 that invokes the hardware accelerator 122 through the drivers 146 to perform some work. The applications 150 can include neural network, video processing, network processing, or the like type applications that offload some functions to the hardware accelerator 122.

In operation, the programmable device 128 is configured with an acceleration circuit 130. In an example, the acceleration circuit 130 includes a shell circuit 130A and an application circuit 130B. For example, the acceleration circuit 130 can be implemented using a static region 134 and a programmable region 136. The shell circuit 130A is implemented in the static region 134. The application circuit 130B is implemented in the programmable region 136, e.g., kernel logic 138.

At least a portion of configuration data for the programmable device 128 can be stored in the NVM 124 if present. If the NVM 124 is omitted, configuration data can be stored external to the hardware accelerator 122, such as in the storage 118. The configuration data for the programmable device 128 can be generated by design tools 108, which can be executed on a computer system external to the server 102. The design tools 108 are used to compile a circuit design into the configuration data, which is then transmitted to and stored in the server 102 for configuring the programmable device 128. In an example, the configuration data includes a base platform (BP) archive 132 for implementing the shell circuit 130A and kernel archive(s) 120 for implementing one or more kernel logics 138. In an example, the BP archive 132 is stored in the NVM 124 and the kernel archive(s) 120 are stored in the storage 118. However, the BP archive 132 can be stored in the storage 118.

The static region 134 is "static" in that the circuitry thereof remains constant across reconfigurations of the programmable region 136. In an example, the static region 134 includes interface circuits (e.g., PCIe endpoint circuits, a direct memory access (DMA) controller, interconnects, a memory controller, a memory interface circuit, decoupler circuits (to support partial reconfiguration), flash programmer, debug circuits, and the like).

In an example, the kernel logic 138 includes an IP checker 180. The IP checker 180 is configured to verify that the kernel logic 138 is authorized for execution in the programmable device 128. The IP checker 180 accesses a signed whitelist 121 that includes a list of valid device identifiers (IDs) of programmable devices authorized to execute the kernel logic 138. In an example, the signed whitelist 121 is stored in the storage 118 either as a separate file or as part of a kernel archive 120. The signed whitelist 121 can be loaded into the programmable device 128 at configuration time or accessed from the storage 118 during runtime. In an example, the signed whitelist 121 is a certificate that includes a list of valid device IDs and a signature generated by a provider of the kernel logic 138 (referred to herein as a system integrator). The IP checker 180 verifies the signature of the signed whitelist 121 and then checks a device ID of the programmable device 128 against the device ID list in the signed whitelist 121. If both conditions are satisfied, the IP checker 180 allows the kernel logic 138 to execute in the programmable device 128. Otherwise, the IP checker 180 prevents execution of the kernel logic 138.

Figure 2:
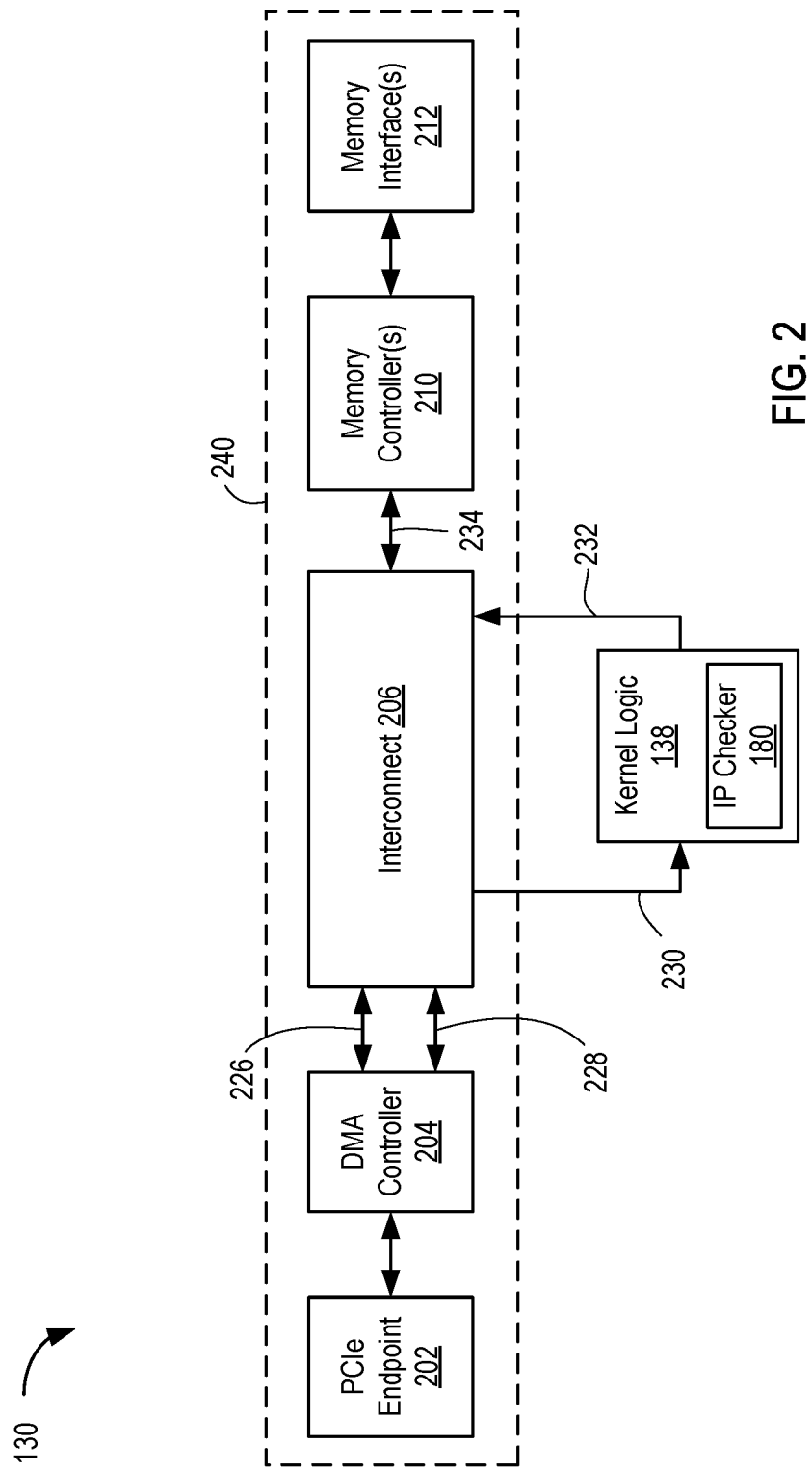
FIG. 2 is a block diagram depicting an acceleration circuit according to an example.

FIG. 2 is a block diagram depicting an acceleration circuit 130 according to an example. The acceleration circuit 130 includes interface circuits 140 and the kernel logic 138. In the example, the interface circuits 140 include a PCIe endpoint circuit ("PCIe endpoint 202"), a DMA controller 204, interconnect circuits ("interconnect 206"), a memory controller 210, and a memory interface 212. The interface circuits 140 can include other support circuits, which are omitted for clarity (e.g., decoupler circuits, debug circuits, etc.). The PCIe endpoint 202 provides a physical interface to the peripheral bus 115. The DMA controller 204 facilitates DMA operations to the RAM 126, the memory 142, and the kernel(s) 138. The interconnect 206 couples the DMA controller 204 to the memory 142 and to an input interface of the kernel(s) 138. The interconnect 206 is coupled to an output interface of the kernel logic 138 and the memory controller 210. The memory controller 210 is coupled to the memory interface 212. The memory interface 212 is coupled to the RAM 126 (shown in FIG. 1).

In operation, the drivers 146 can access the kernel logic 138 directly through the DMA controller 204. The kernel logic 138 can access the RAM 126 through the memory controller 210. Data can be exchanged between the software 106 and the kernel logic 138 using DMA operations between the system memory 116 and the RAM 126. In some examples, the IP checker 180 receives the signed whitelist 121 during runtime using DMA operations (if not configured with the signed whitelist 121 at configuration time).

Figure 3:
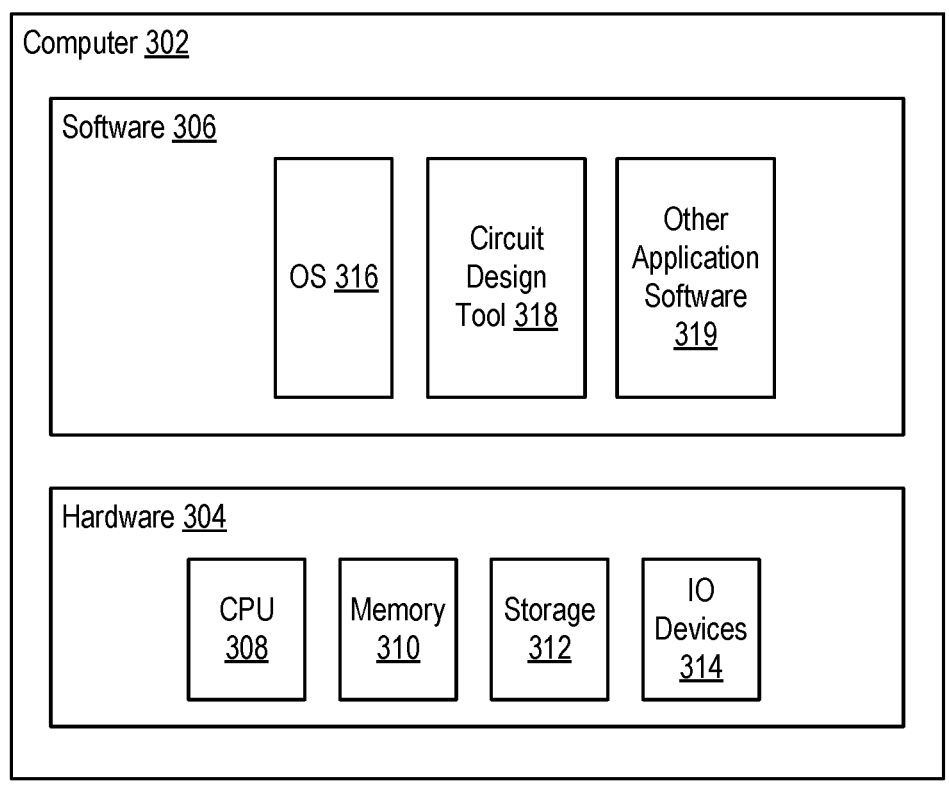
FIG. 3 is a block diagram depicting design tools according to an example.

FIG. 3 is a block diagram depicting the design tools 108 according to an example. The design tools 108 include a computer 302 having a hardware platform 304 and a software platform 306. The hardware platform 304 includes a CPU 308, a memory 310, storage devices 312, and input/output (IO) devices 314. The CPU 308 can be any type of microprocessor. The memory 310 can include, for example, one or more RAM modules, such as DDR DRAM. The storage devices 312 includes local storage devices (e.g., one or more hard disks, flash memory modules, solid state disks, and optical disks) and/or a storage interface that enables the computer 302 to communicate with one or more network data storage systems. The 10 devices 314 enable communication to and from the computer 302. The software platform 306 includes an OS 316 and a circuit design tool 318. The OS 316 can be any commodity operating system known in the art, such as such as Linux®, Microsoft Windows®, Mac OS®, or the like. The circuit design tool 318 is configured to generate circuit designs that can be used to program programmable devices. A user interacts with the circuit design tool 318 to generate kernel design(s) for the acceleration circuit 130. The circuit design tool 318 adds the IP checker 180 to each kernel design, as described further below. The software platform 306 can include other application software 319 for performing other functions, such as public/private key generation, encryption, decryption, and the like, as discussed further herein.

Figure 4:
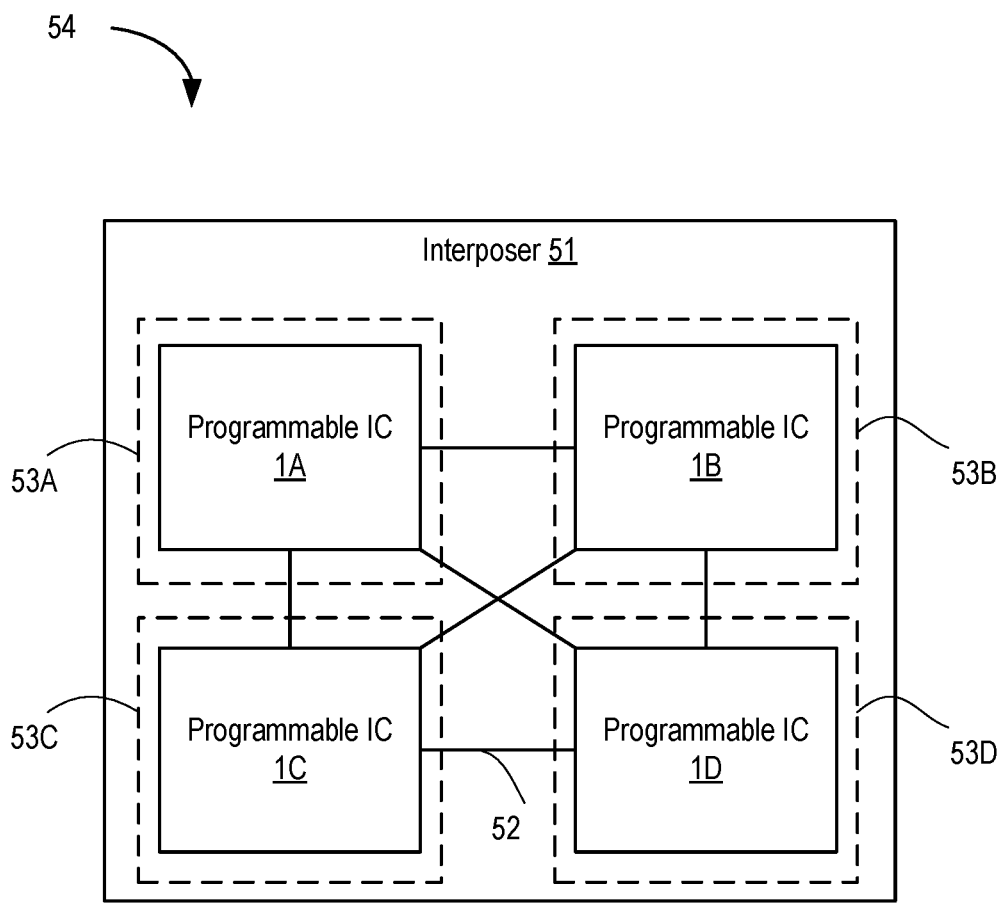
FIG. 4 is a block diagram depicting a programmable device according to an example.

FIG. 4 is a block diagram depicting a programmable device 54 according to an example. The programmable device 54 includes a plurality of programmable integrated circuits (ICs) 1, e.g., programmable ICs 1A, 1B, 1C, and 1D. In an example, each programmable IC 1 is an IC die disposed on an interposer 51. Each programmable IC 1 comprises a super logic region (SLR) 53 of the programmable device 54, e.g., SLRs 53A, 53B, 53C, and 53D. The programmable ICs 1 are interconnected through conductors on the interposer 51 (referred to as super long lines (SLLs) 52).

Figure 5:
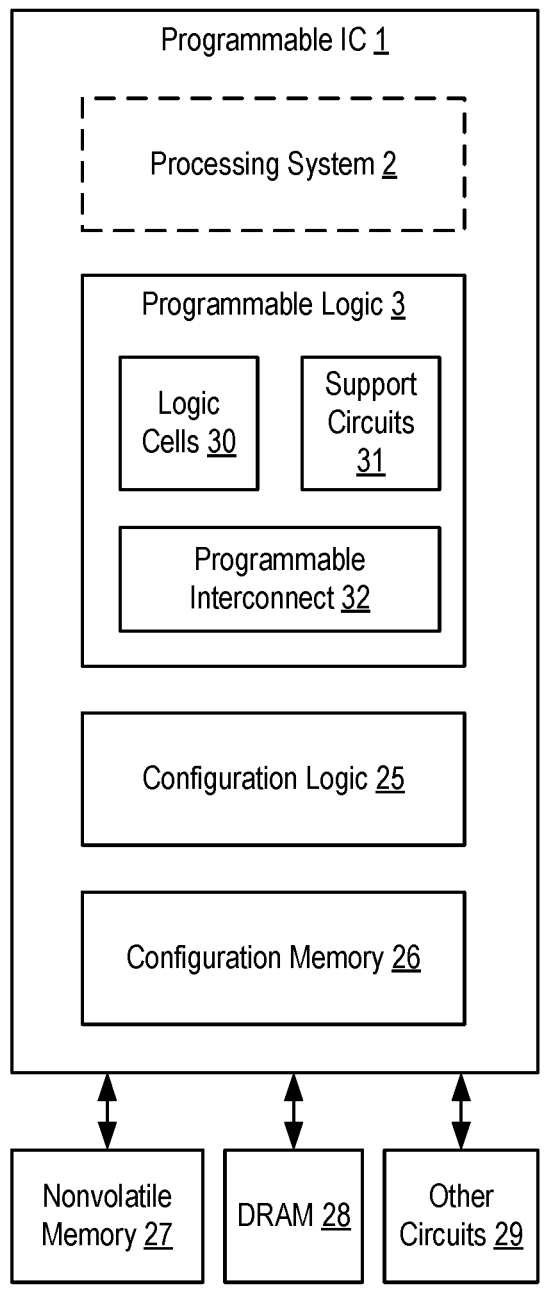
FIG. 5 is a block diagram depicting a programmable IC according to an example.

FIG. 5 is a block diagram depicting a programmable IC 1 according to an example. The programmable IC 1 includes programmable logic 3 (also referred to as a programmable fabric), configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like.

Figure 6:
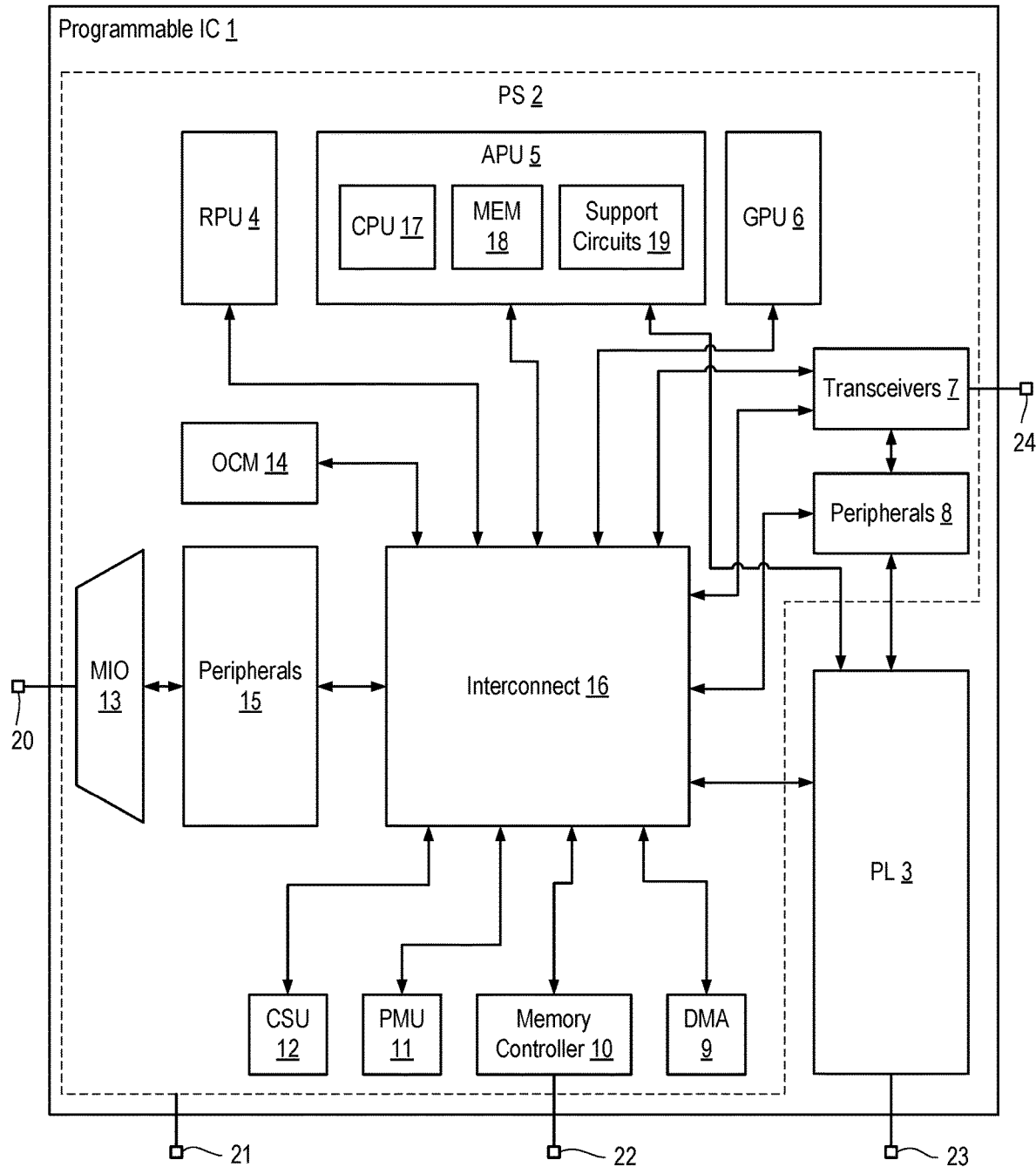
FIG. 6 is a block diagram depicting a System-on-Chip (SoC) implementation of the programmable IC according to an example.

FIG. 6 is a block diagram depicting a System-on-Chip (SoC) implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-chip memory (OCM) 14, transceivers 7, peripherals 8, interconnect 16, DMA circuit 9, memory controller 10, peripherals 15, and multiplexed 10 (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

In the example of FIG. 6, the programmable IC 1 can be used in the hardware accelerator 122 and can function as described above. The acceleration circuit 130 can be programmed in the PL 3 and function as described above. In another example, the functionality of the hardware 104 described above can be implemented using the PS 2, rather than through hardware of a computing system. In such case, the software 106 executes on the PS 2 and functions as described above.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 15 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose 10 (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, MGTs, and the like.

Figure 7:
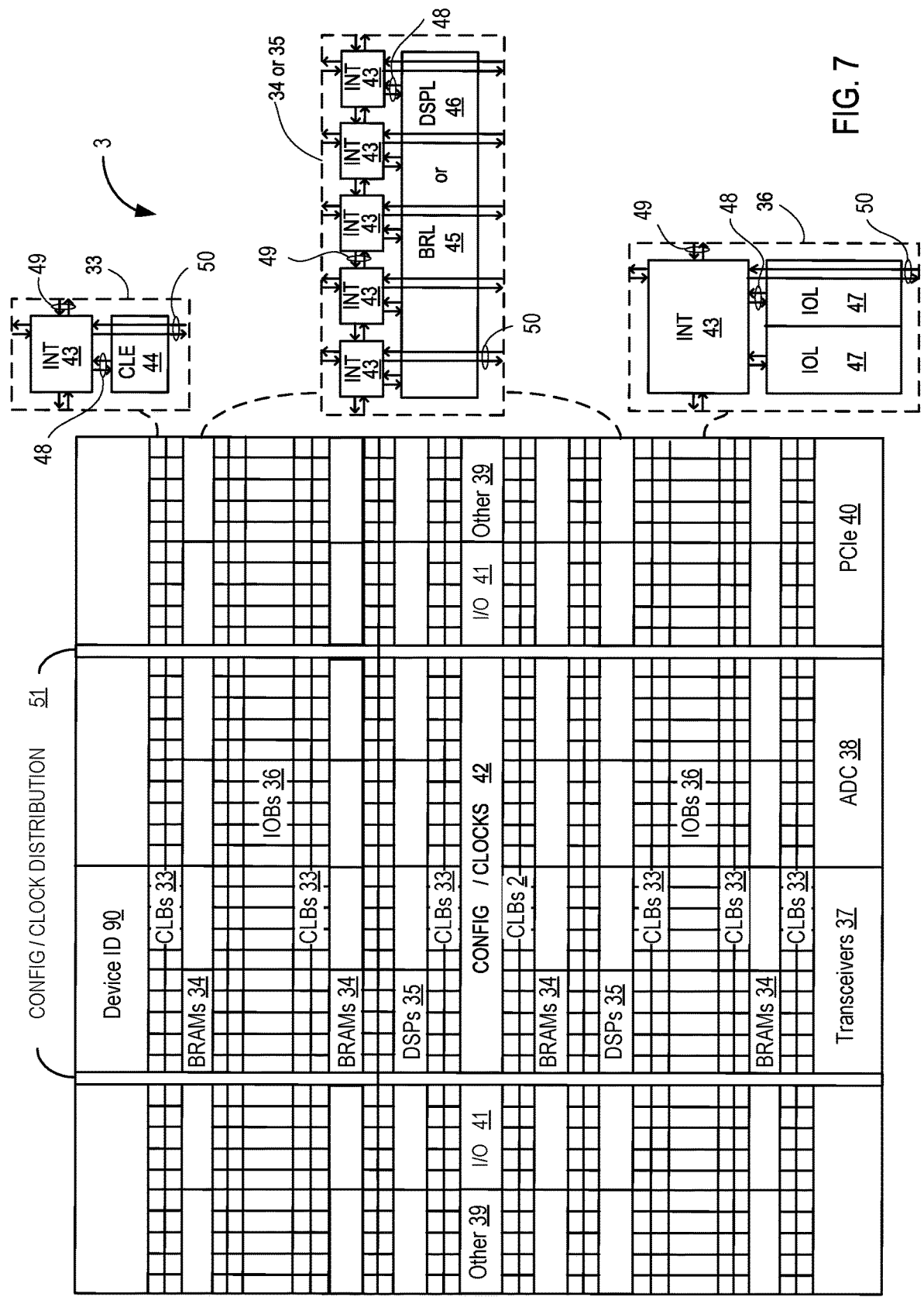
FIG. 7 illustrates a field programmable gate array (FPGA) implementation of the programmable IC.

FIG. 7 illustrates a field programmable gate array (FPGA) implementation of the programmable IC 1 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 7. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 6) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In an example, the PL 3 in a programmable device includes non-volatile memory that stores a device ID 90 (e.g., electronic fuses or the like). The device ID can be any type of unique identifier used by the manufacturer of the programmable device (e.g., a 96-bit binary number). If the programmable device includes multiple programmable ICs, each of the programmable ICs can include a unique device ID 90.

Figure 8:
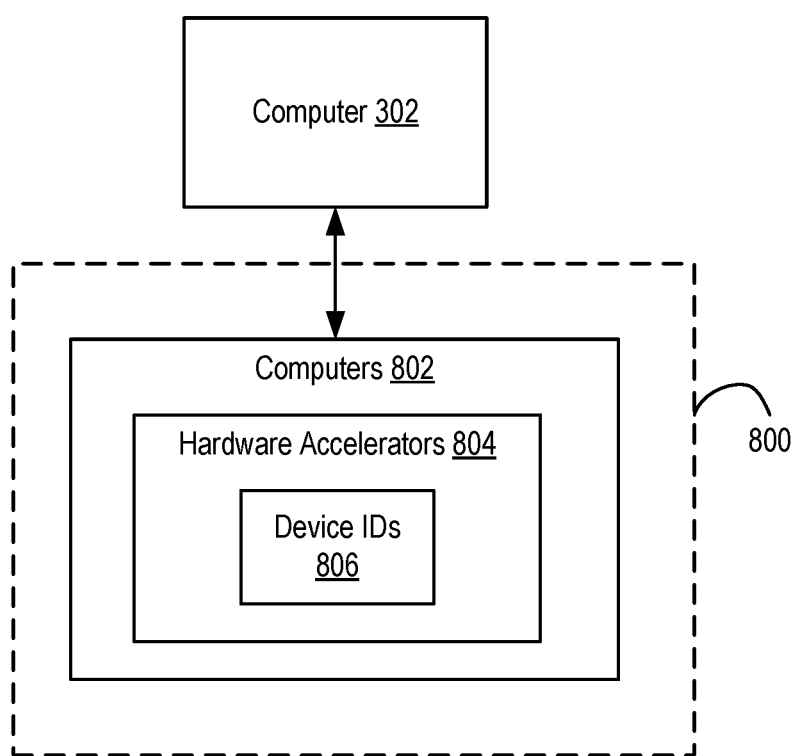
FIG. 8 is a block diagram depicting a cloud computing system according to an example.

FIG. 8 is a block diagram depicting a cloud computing system 800 according to an example. The cloud computing system 800 includes a plurality of computers 802 each having one or more hardware accelerators 804. Each hardware accelerator 804 includes one or more programmable devices, each having one or more device IDs 806. For a given kernel, a cloud owner can provide a list of device IDs 806 for programmable devices for which execution of the kernel is desired. The list of device IDs 806 can be received by the computer 302 and processed as described below.

Figure 9:
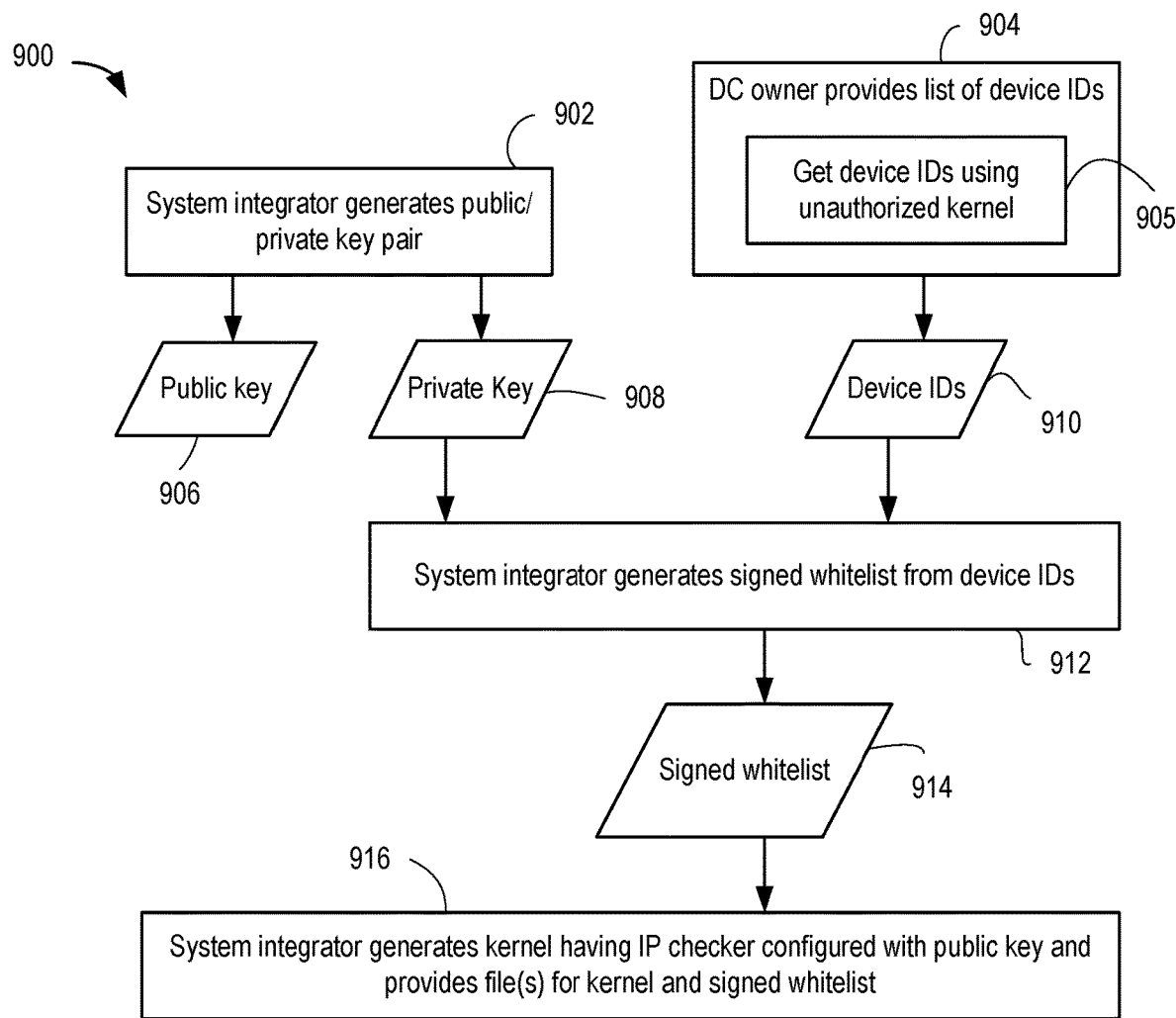
FIG. 9 is a flow diagram depicting a method of locking a kernel for execution on particular programmable devices according to an example.

FIG. 9 is a flow diagram depicting a method 900 of locking a kernel for execution on particular programmable devices according to an example. The method 900 includes a step 902, where the system integrator (e.g., kernel developer) generates a public/private key pair using any public-key cryptographic system. In an example, the public-key cryptographic system is a Rivest-Shamir-Adleman (RSA) system, such as RSA-4096. In such a system, a public key 906 is the encryption key and a private key 908 is the decryption key. However, in the present system, the private key 908 is being used to encrypt and the public key 906 is used to decrypt. This notion of signing using encryption with the private key and decryption with the public key will be used throughout this description.

In RSA-4096, the public/private keys are 4096-bit keys. Those skilled in the art will appreciate that other public-key cryptographic systems can be used. For purposes of clarity by example, RSA-4096 is described in the examples provided herein. Step 902 can be performed by software executing on the computer 302.

At step 904, the DC owner retrieves the list of device IDs 910 from the programmable devices 128 allowed to execute the kernel logic 138 from the data center (e.g., device IDs for devices that are to be licensed by the system integrator for execution of the kernel). In an example, the cloud owner can get the device IDs by loading an unauthorized kernel to the programmable devices. The IP checker 180 will prevent the kernel from executing, but will provide the device IDs as output (e.g., the IP checker 180 can read back the device ID from a programmable device).

At step 912, the system integrator generates a signed whitelist 914 from the device IDs 910 using software executing on the computer 302. The signed whitelist 914 includes the device IDs 910 and a signature generated by the system integrator. The signature is generated by computing a hash of the list of device IDs (e.g., a concatenation of device IDs). The hash can be computed using any hash function known in the art, such as a 256-bit Secure Hash Algorithm (SHA-256). For purposes of clarity by example, SHA-256 is described as the hash function used herein. The hash value and the private key are then fed into an encryption algorithm (e.g., using RSA-4096), which encrypts the cleartext hash value to generate a ciphertext signature (e.g., an encrypted version of the hash value).

At step 916, the system integrator generates the kernel having the IP checker 180 using the circuit design tool 318. The IP checker 180 is configured with the public key 906. The system integrator provides file(s) for the kernel and the signed whitelist 914.

Figure 10:
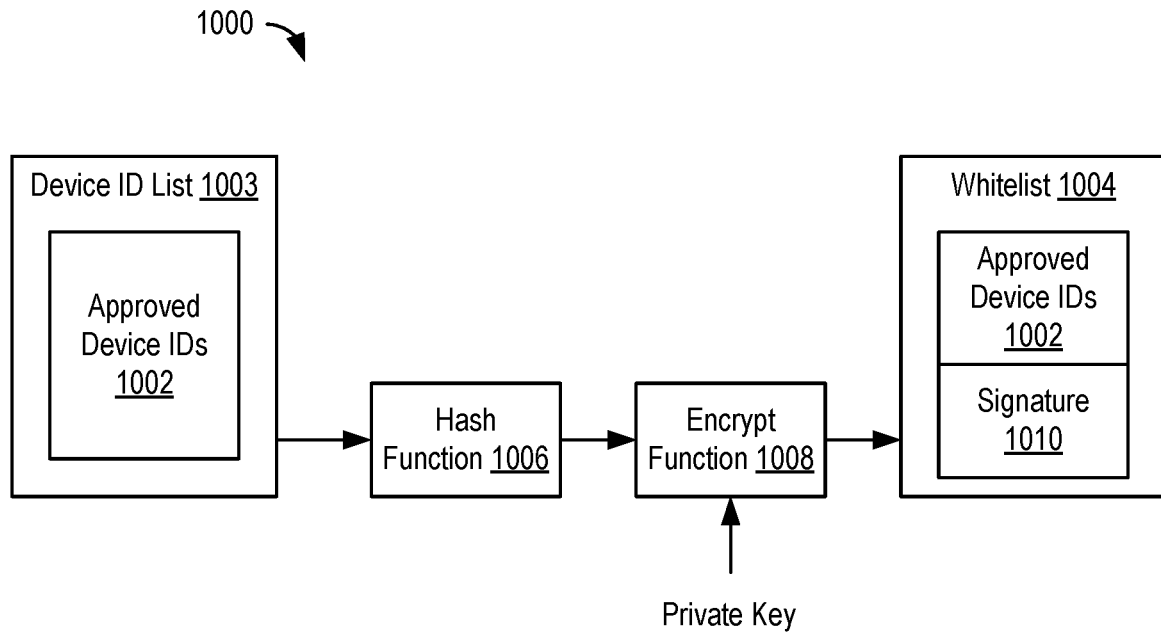
FIG. 10 is a block diagram depicting a method of generating a signed whitelist of device IDs according to an example.

FIG. 10 is a block diagram depicting a method 1000 of generating a signed whitelist of device IDs according to an example. A device ID list 1003 includes a plurality of approved device IDs 1002 for programmable devices for which execution of the kernel is sought. The device ID list 1003 (e.g., a concatenation of the device IDs 1002) is processed by a hash function 1006 (e.g., SHA-256) to generate a hash of the device ID list 1003. The hash is processed by an encrypt function 1008 using a private key of the system integrator to generate a signature 1010. A whitelist 1004 includes the approved device IDs 1002 and the signature 1010.

Figure 11:
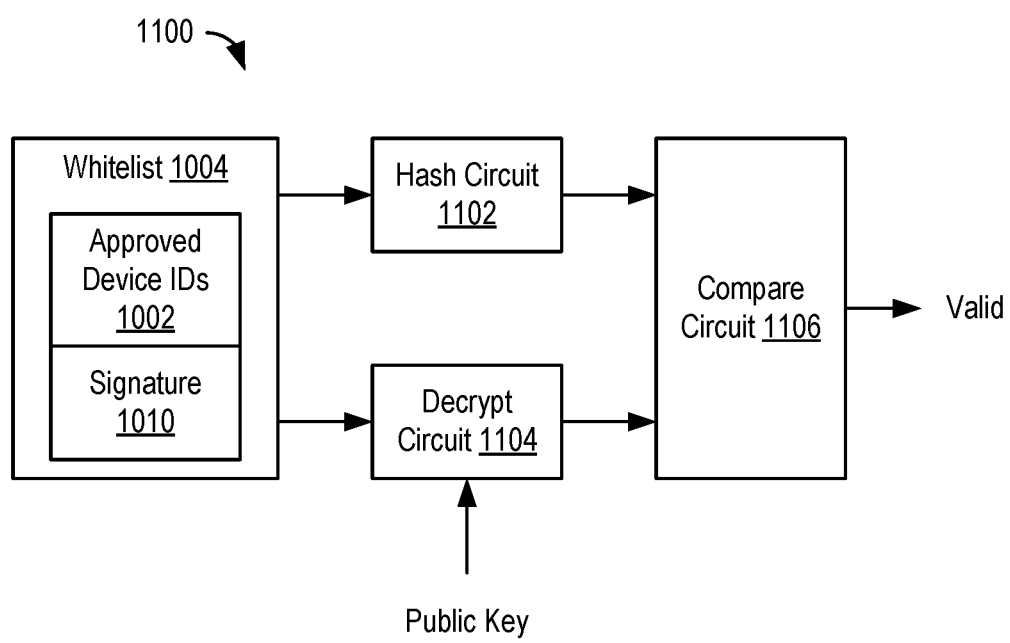
FIG. 11 is a block diagram depicting a method of checking validity of a signed whitelist according to an example.

FIG. 11 is a block diagram depicting a method 1100 of checking validity of a signed whitelist according to an example. The approved device ID 1002 is processed by a hash circuit 1102 of the IP checker 180 to generate a hash value (e.g., using SHA-256). The signature 1010 is also processed by a decrypt circuit 1104 of the IP checker 180 that has access to the public key of the system integrator. The decrypt circuit 1104 decrypts the signature 1010 to generate a cleartext hash value (e.g., recover the hash value computed by the system integrator). The compare circuit 1106 compares the two hash values to determine if the whitelist 1004 is valid (e.g., has not been tampered with).

Figure 12:
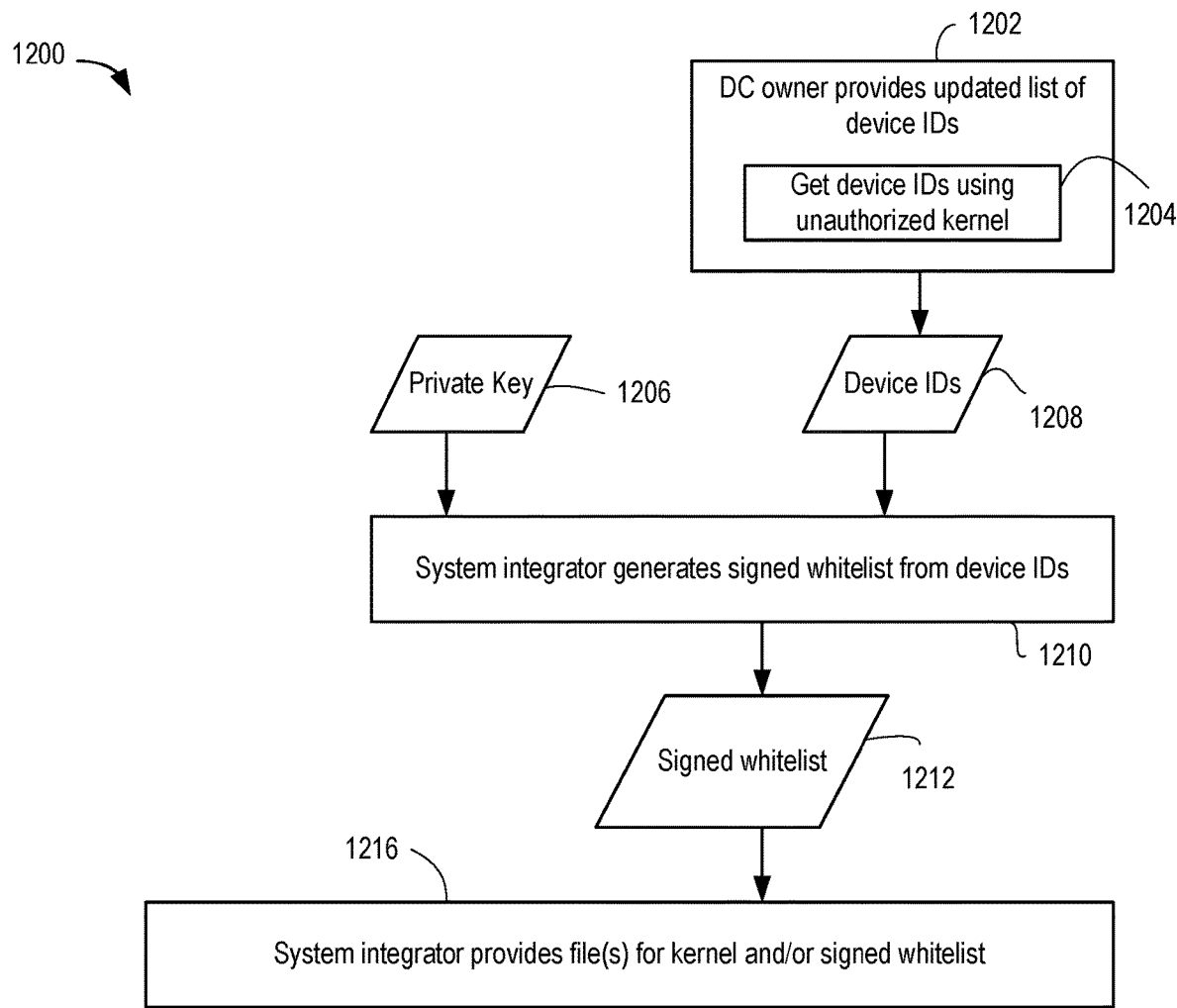
FIG. 12 is a flow diagram depicting a method of updating a whitelist according to an example.

FIG. 12 is a flow diagram depicting a method 1200 of updating a whitelist according to an example. The method 1200 includes a step 902, where the data center owner provides an updated list of device IDs 1208 for programmable devices allowed to execute the kernel (e.g., device IDs for devices that are to be licensed by the system integrator for execution of the kernel). In an example, the cloud owner can get the device IDs by loading an unauthorized kernel to the programmable devices. The IP checker 180 will prevent the kernel from executing, but will provide the device IDs as output (e.g., the IP checker 180 can read back the device ID from a programmable device).

At step 1210, the system integrator generates a signed whitelist 1212 from the device IDs 1208 and a private key 1206 using software executing on the computer 302. The signed whitelist 1212 includes the device IDs 1208 and a signature generated by system integrator. The signature is generated by computing a hash of the device ID list and encrypting the cleartext hash to generate a ciphertext signature, as described above. At step 1216, the system integrator provides file(s) for the signed whitelist 1212.

Figure 13:
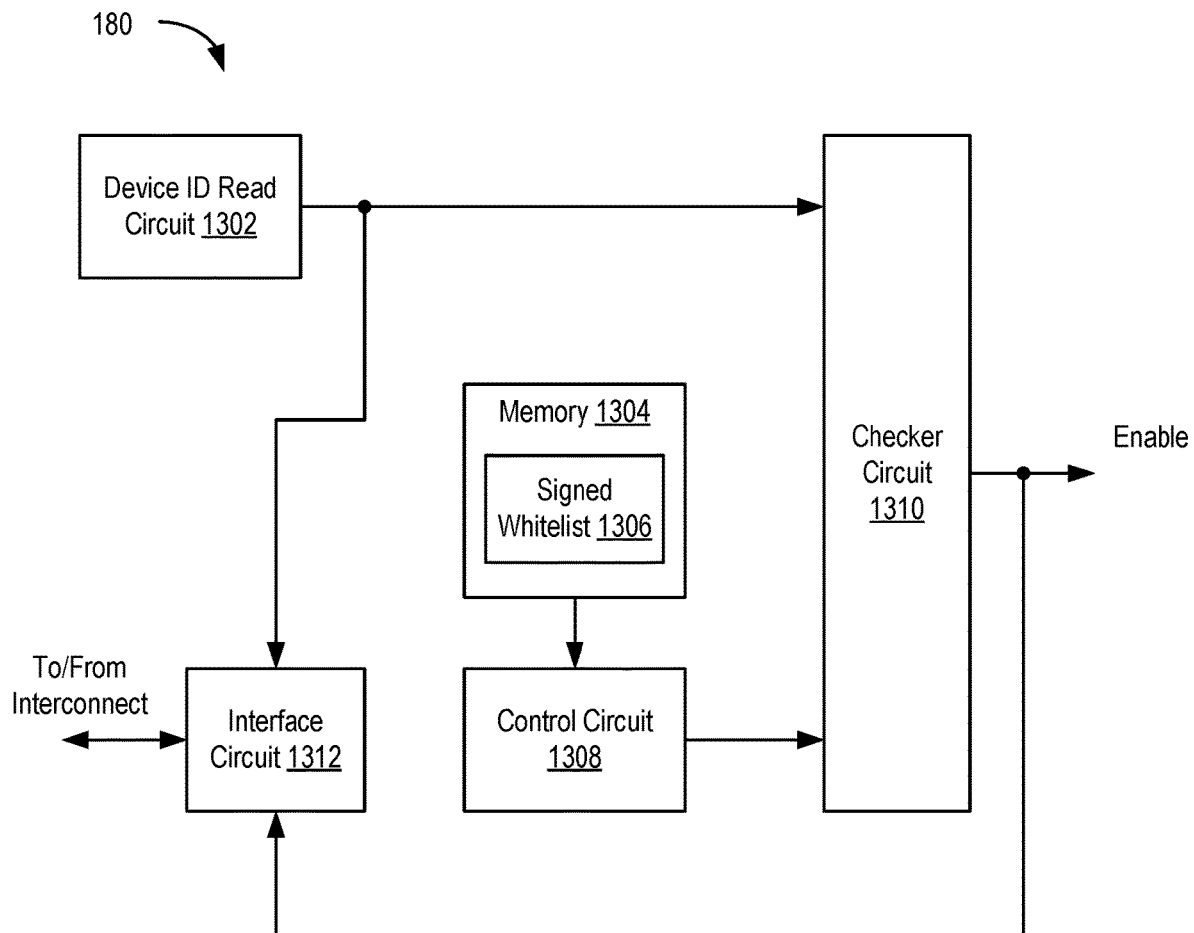
FIG. 13 is a block diagram depicting an IP checker according to an example.

FIG. 13 is a block diagram depicting the IP checker 180 according to an example. The IP checker 180 includes a device ID read circuit 1302, an interface circuit 1312, a memory 1304, a control circuit 1308, and a checker circuit 1310. An output of the device ID read circuit 1302 is coupled to inputs of the checker circuit 1310 and the interface circuit 1312. The control circuit 1308 is coupled to the memory 1304 and has an output coupled to the checker circuit 1310. The output of the checker circuit 1310 is coupled to an input of the interface circuit 1312.

The device ID read circuit 1302 is configured to read the device ID of the programmable device. In this example, the memory 1304 is configured to store a signed whitelist 1306. The checker circuit 1310 is configured to receive the device ID and the signed whitelist 1306 (via the control circuit 1308). The checker circuit 1310 performs the method 1100 of FIG. 11 to validate the signed whitelist 1306. The checker circuit 1310 also compares the device ID with the validated whitelist 1306 to determine if the device is authorized. If so, the checker circuit 1310 asserts the enable output (e.g., the kernel is enabled). Otherwise, the checker circuit 1310 deasserts the enable output (e.g., the kernel is disabled). The IP checker 180 can output the device ID from the device ID read circuit 1302 via the interface circuit 1312.

Figure 14:
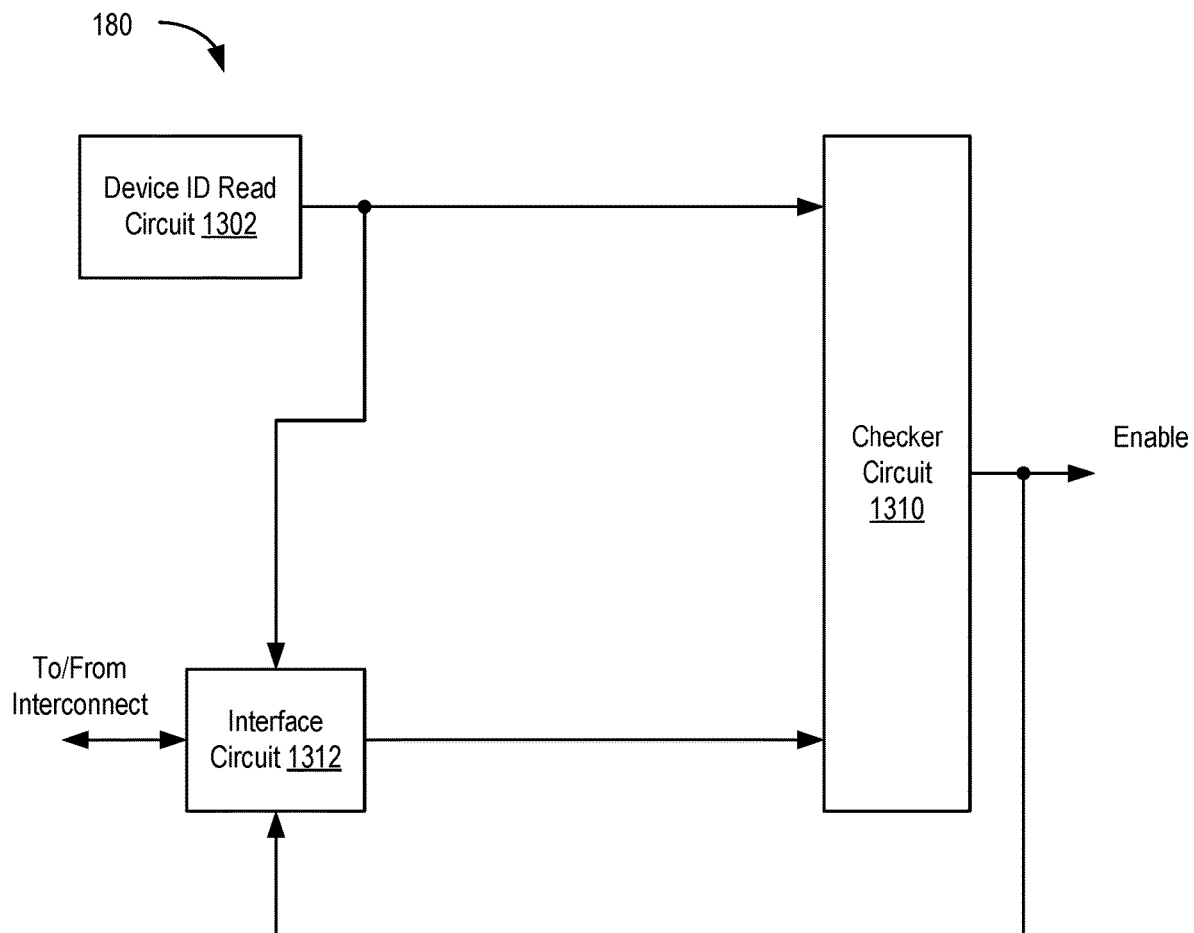
FIG. 14 is a block diagram depicting an IP checker according to another example.

FIG. 14 is a block diagram depicting the IP checker 180 according to another example. In this example, the memory 1304 and the control circuit 1308 are omitted. Rather, the IP checker 180 obtains the signed whitelist from an external source through the interface circuit 1312 (e.g., from the host computer system). Otherwise, the IP checker 180 functions as described above.

Figure 15:
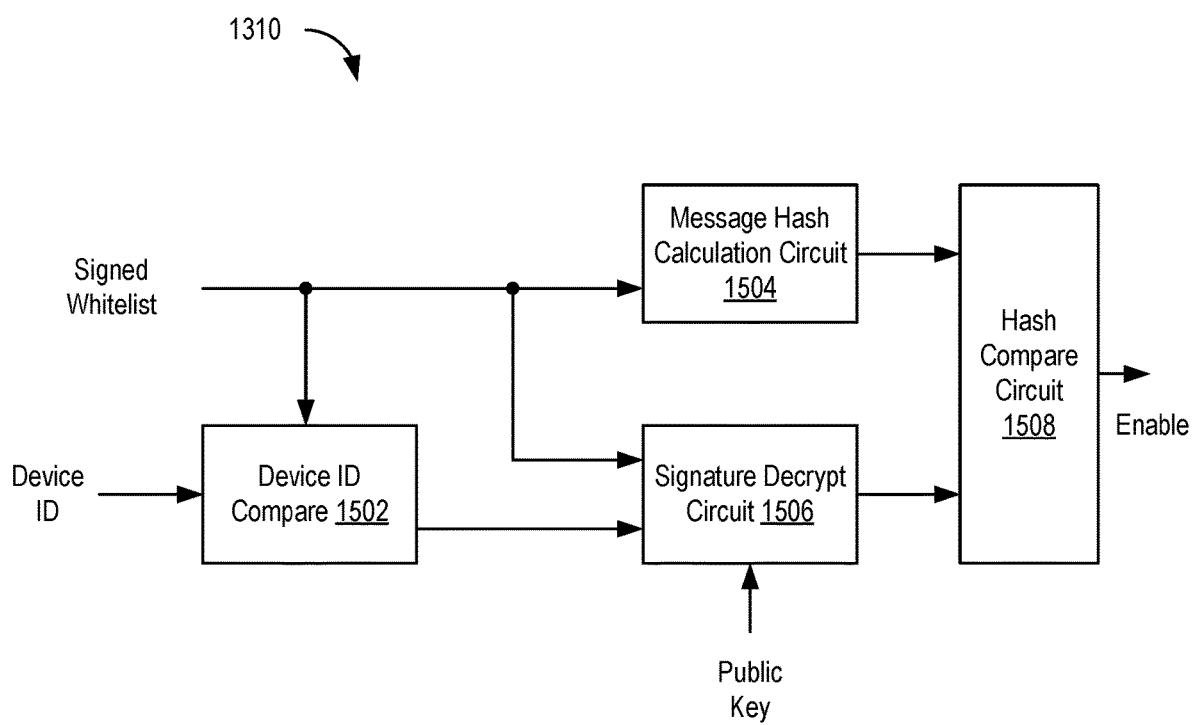
FIG. 15 is a block diagram depicting a checker circuit of an IP checker according to an example.

FIG. 15 is a block diagram depicting the checker circuit 1310 according to an example. The checker circuit 1310 includes a device ID compare circuit 1502, a message hash calculation circuit 1504, a signature decrypt circuit 1506, and a hash compare circuit 1508. The device ID compare circuit 1502 receives the signed whitelist and the device ID. The device ID compare circuit 1502 determines whether the device ID is present in the device ID list in the signed whitelist. If so, the signature decrypt circuit 1506 uses the public key configured in the IP checker 180 (i.e., the system integrator's public key) to decrypt the signature in the signed whitelist and recover the cleartext hash value. The message hash calculation circuit 1504 is configured to generate a hash value from the approved device IDs 1002 from the signed whitelist. The hash compare circuit 1508 is configured to compare the two hash values output by the message hash calculation circuit 1504 and the signature decrypt circuit 1506, respectively. If the two hash values match, the hash compare circuit 1508 asserts the enable output. Otherwise, the hash compare circuit 1508 deasserts the enable output.

As noted above, the IP checker 180 operates based on a unique identifier of the programmable device. A kernel developer wishing to license individual instances of their IP need access to the unique IDs of the authorized devices in order to lock the IP for execution on those devices.

Figure 16A:
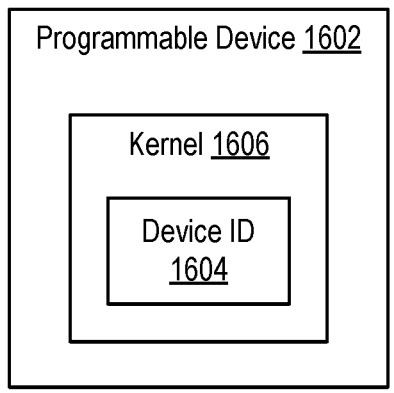
FIGS. 16A-C are block diagrams depicting examples of device ID location in programmable devices.
Figure 16B:
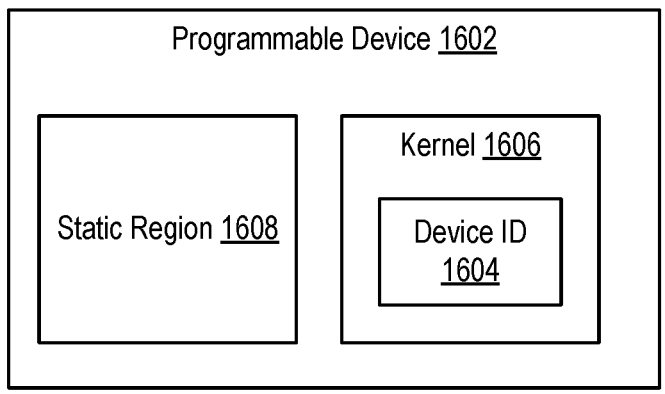
Figure 16C:
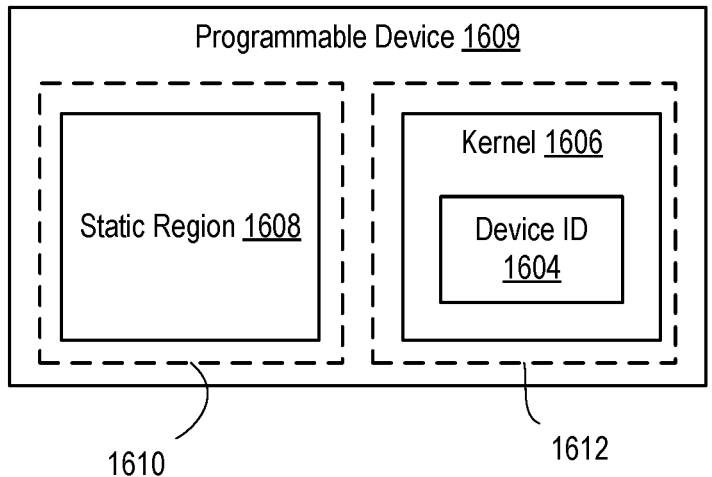

FIGS. 16A-C are block diagrams depicting examples of device ID location in programmable devices. As shown in FIG. 16A, a programmable device 1602 includes a single programmable IC (e.g., not a multi-die device). A kernel 1606 is configured in the programmable device 1602. The kernel 1606 is a complete configuration of the programmable device 1602 and functions without a shell circuit. In such case, the kernel 1606 has access to all functionality of the programmable device 1602, including circuitry for reading a device ID 1604 of the programmable device 1602.

As shown in FIG. 16B, a programmable device 1602 includes a single programmable IC (e.g., not a multi-die device). However, in this example, a static region 1608 includes a shell circuit that supports the kernel 1606. The programmable device 1602 includes circuitry for reading the device ID 1604. The kernel 1606 has access to the circuitry that reads the device ID 1604.

As shown in FIG. 16C, a programmable device 1609 includes multiple programmable ICs (e.g., a multi-die device). The static region 1608 is configured in one SLR 1610 of the programmable device 1609 and the kernel 1606 is configured in another SLR 1612 of the programmable device 1609. In some devices, one of the SLRs functions as a "master SLR" and one or more "slave SLRs." Assume the SLR 1610 is a master SLR having the static region 1608 and the SLR 1612 is a slave SLR having the kernel 1606. Both the SLR 1610 and the SLR 1612 have a unique device ID and circuitry for reading the device ID. Absent specificity, a circuit design that reads a device ID of the programmable device 1609 reads the device ID of the master SLR. However, it is not feasible to export the device ID from the static region 1608 to the kernel 1606 in a manner that can be demonstrated to be proof against spoofing of the device ID. In some cases, the data center owner has control of the configuration of the static region 1608. Thus, in an example, circuit design tool 318 is configured to use a device ID 1604 of the SLR 1612 for IP checking. Since the kernel 1606 completely configures the SLR 1612, the kernel 1606 has access to the circuitry for reading the device ID 1604 of the SLR 1612. Thus, rather than using a device ID of the SLR 1610 for IP checking, the IP checker 180 uses the device ID 1604 of the SLR 1612. Thus, the system integrator can be confident that the device ID 1604 cannot be spoofed.

Figure 17:
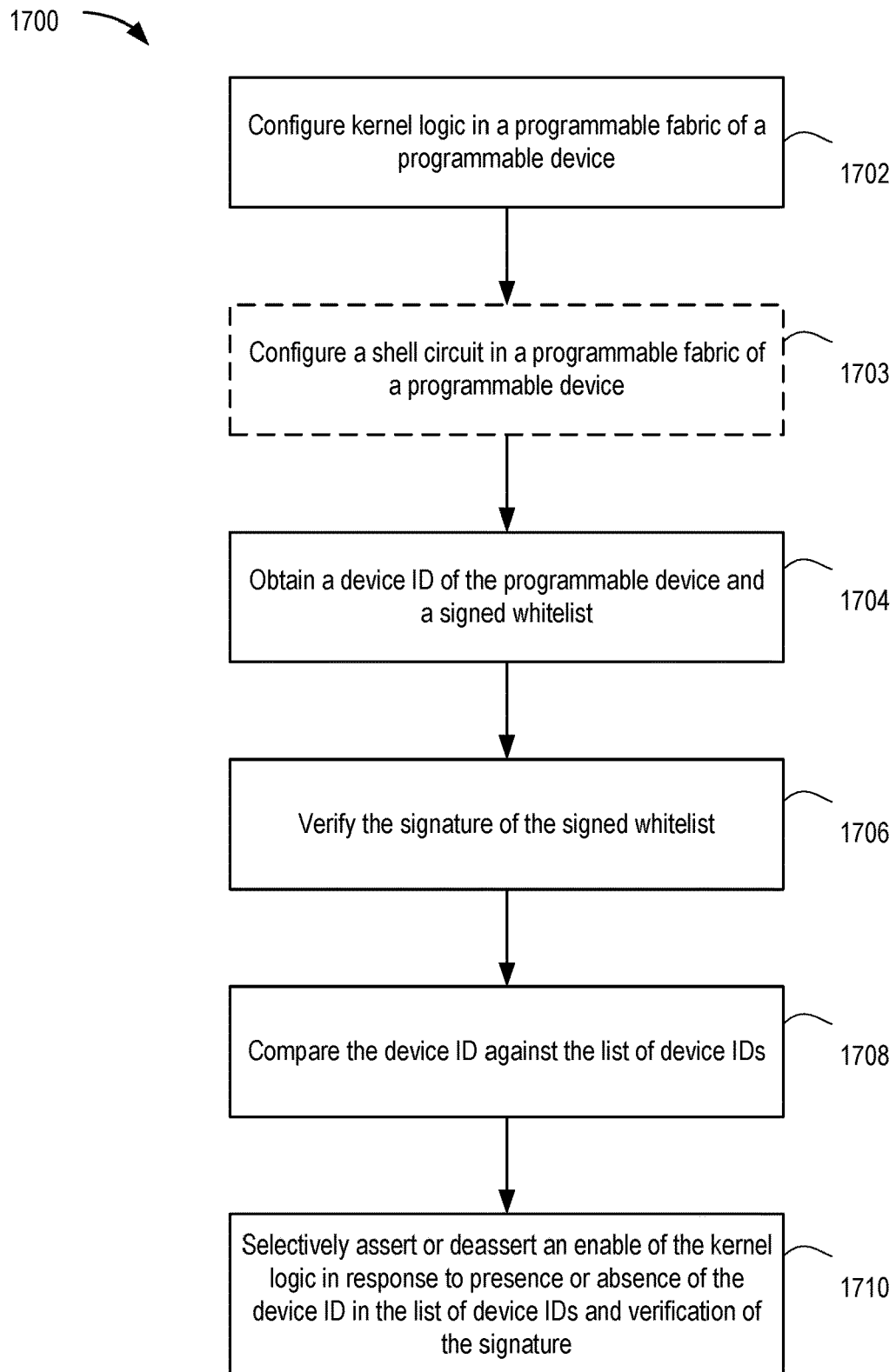
FIG. 17 is a flow diagram depicting a method of locking kernel logic to a programmable device of a hardware accelerator in a computer system according to an example.

FIG. 17 is a flow diagram depicting a method 1700 of locking kernel logic to a programmable device of a hardware accelerator in a computer system according to an example. The method 1700 begins at step 1702, where kernel logic is configured in a programmable fabric of a programmable device. At optional step 1703, a shell circuit is also configured in a programmable fabric of the programmable device. At step 1704, an IP checker circuit 180 obtains a device ID of the programmable device and a signed whitelist. At step 1706, the IP checker circuit 180 verifies the signature of the signed whitelist. At step 1708, the IP checker circuit 180 compares the device ID against the list of device IDs. At step 1710, the IP checker circuit 180 selectively asserts or deasserts an enable of the kernel logic in response to presence or absence of the device ID in the list of device IDs and verification of the signature. Operation of the IP checker circuit 180 to perform these steps is described substantially above.

While the foregoing is directed to specific examples, other and further examples may be devised without departing from the basic scope thereof, and the scope thereof is determined by the claims that follow.

What is claimed is:

1. A hardware accelerator for a computer system, the hardware accelerator including a programmable device, the hardware accelerator comprising:
   a static region comprising non-reconfigurable static circuitry; and
   kernel logic configured in a programmable portion of the programmable device, wherein the kernel logic is at least partially reconfigurable, and operation of the kernel logic is configured to be selectively enabled or disabled, and wherein the kernel logic comprises an intellectual property (IP) checker circuit, the IP checker circuit configured to:
      obtain a device identifier (ID) of the programmable device and a signed whitelist, the signed whitelist including a list of device IDs and a signature;
      verify the signature of the signed whitelist;
      compare the device ID against the list of device IDs; and
      selectively enable or disable the operation of the kernel logic by selectively asserting or deasserting an enable of the kernel logic based on presence or absence, respectively, of the device ID in the list of device IDs and verification of the signature.

2. The hardware accelerator of claim 1, further comprising:
   a shell circuit configured in the programmable portion, the shell circuit configured to provide an interface between a computer system and the kernel logic.

3. The hardware accelerator of claim 1, wherein the IP checker circuit is configured with the signed whitelist.

4. The hardware accelerator of claim 1, wherein the IP checker circuit receives the signed whitelist from a computer system having the hardware accelerator disposed therein.

5. The hardware accelerator of claim 1, wherein the IP checker circuit is configured to verify the signature of the signed whitelist by:
   decrypting the signature using a public key of a public/private key pair, the signature encrypted using a private key of the public/private key pair;
   determining a hash of the list of device IDs; and
   comparing the hash with the decrypted signature.

6. The hardware accelerator of claim 1, wherein the IP checker circuit comprises:
   a device ID read circuit configured to read the device ID;
   a memory configured to store the signed whitelist; and
   a checker circuit configured to compare the device ID against the list of device IDs and selectively assert or deassert the enable of the kernel logic.

7. The hardware accelerator of claim 1, wherein the IP checker circuit comprises:

a device ID read circuit configured to read the device ID;
an interface circuit configured to receive the signed whitelist from a computer system; and
a checker circuit configured to compare the device ID against the list of device IDs and selectively assert or deassert the enable of the kernel logic.

8. A computer system, comprising:
a processing system; and
a hardware accelerator, coupled to the processing system, the hardware accelerator including:
   a static region comprising non-reconfigurable static circuitry; and
   kernel logic configured in a programmable portion of a programmable device, wherein the kernel logic is at least partially reconfigurable, and operation of the kernel logic is configured to be selectively enabled or disabled, and wherein the kernel logic comprises an intellectual property (IP) checker circuit in the kernel logic, the IP checker circuit configured to:
      obtain a device identifier (ID) of the programmable device and a signed whitelist, the signed whitelist including a list of device IDs and a signature;
      verify the signature of the signed whitelist;
      compare the device ID against the list of device IDs; and
      selectively enable or disable the operation of the kernel logic by selectively asserting or deasserting an enable of the kernel logic based on presence or absence, respectively, of the device ID in the list of device IDs and verification of the signature.

9. The computer system of claim 8, wherein the hardware accelerator further comprises a shell circuit configured in the programmable portion, the shell circuit configured to provide an interface between the processing system and the kernel logic.

10. The computer system of claim 8, wherein the IP checker circuit is configured with the signed whitelist.

11. The computer system of claim 8, wherein the IP checker circuit receives the signed whitelist from the processing system.

12. The computer system of claim 8, wherein the IP checker circuit is configured to verify the signature of the signed whitelist by:
   decrypting the signature using a public key of a public/private key pair, the signature encrypted using a private key of the public/private key pair;
   determining a hash of the list of device IDs; and
   comparing the hash with the decrypted signature.

13. The computer system of claim 8, wherein the IP checker circuit comprises:
   a device ID read circuit configured to read the device ID;
   a memory configured to store the signed whitelist; and
   a checker circuit configured to compare the device ID against the list of device IDs and selectively assert or deassert the enable of the kernel logic.

14. The computer system of claim 8, wherein the IP checker circuit comprises:
   a device ID read circuit configured to read the device ID;
   an interface circuit configured to receive the signed whitelist from the processing system; and
   a checker circuit configured to compare the device ID against the list of device IDs and selectively assert or deassert the enable of the kernel logic.

15. A method of locking kernel logic, the method comprising:
   configuring kernel logic in a programmable portion of a programmable device of a hardware accelerator, wherein the hardware accelerator comprises a static region comprising non-reconfigurable static circuitry, and wherein operation of the kernel logic is configured to be selectively enabled or disabled;
   obtaining, at an intellectual property (IP) checker circuit in the kernel logic, a device identifier (ID) of the programmable device and a signed whitelist, the signed whitelist including a list of device IDs and a signature;
   verifying the signature of the signed whitelist;
   comparing the device ID against the list of device IDs; and
   selectively enabling or disabling the operation of the kernel logic by selectively asserting or deasserting, by the IP checker circuit, an enable of the kernel logic based on presence or absence, respectively, of the device ID in the list of device IDs and verification of the signature.

16. The method of claim 15, further comprising:
   configuring a shell circuit in the programmable portion, the shell circuit configured to provide an interface between a computer system and the kernel logic.

17. The method of claim 15, wherein the IP checker circuit is configured with the signed whitelist.

18. The method of claim 15, wherein the IP checker circuit receives the signed whitelist from a computer system.

19. The method of claim 15, wherein the IP checker circuit is configured to verify the signature of the signed whitelist by:
   decrypting the signature using a public key of a public/private key pair, the signature encrypted using a private key of the public/private key pair;
   determining a hash of the list of device IDs; and
   comparing the hash with the decrypted signature.

20. The method of claim 19, wherein the signature comprises a pre-computed hash of the list of device IDs encrypted by the private key.

* * * * *